Patented July 11, 1950

2,514,399

UNITED STATES PATENT OFFICE 2,514,399

PROCESS FOR RESOLVING EMULSIONS

Willard H. Kirkpatrick and Doyne L. Wilson, Sugar Land, Tex., assignors to Visco Products Company, Houston, Tex., a corporation of Delaware No Drawing. Application October 29, 1945, Serial No. 625,456

15 Claims. (Cl. 252—331)

This invention relates to the art of resolving petroleum emulsion of the oil-in-water type occasionally encountered in the production, handling, and refining of petroleum. These oil-in-water emulsions, so-called reversed emulsions, occur frequently in the Flower's Bluff, Freer, and Seven Sisters pools of southwestern Texas, and are occasionally encountered in other oil producing areas.

A primary object of this invention is to provide an improved process and reagents for treating these reversed petroleum emulsions to separate them into their component parts of oil and water.

Another object is to provide a novel product or reagent which is water wettable, interfacial and surface-active in order to enable its employment as a demulsifier, or for such uses where water wettable properties and characteristics are necessary or desirable.

Another object is to provide an improved process for the resolution of emulsions of the same type, but not encountered in oil-fields; for example, water in the hold of a ship may be contaminated with oil under such conditions as to produce an emulsion of the type referred to; clarification of the water prior to disposal in a harbor or bay area may be effected by said method if desired. Likewise, it may be applied to any case where separation of such an emulsion into its components is required.

Further objects will appear from the following description in which the reagents and the process for their employment will be described as related to their employment for the treatment of petroleum emulsion.

For the most part oil-field emulsions are of the water-in-oil type, but the emulsions specified in this invention are of the oil-in-water type, and are usually referred to as reversed emulsions. A reversed emulsion, as encountered in the oil-fields, contains a small amount of oil, usually less than one per cent, as the disperse phase, and its presence is denoted by the milky tinge which it imparts to the water, which is usually low in salt content. In the aforementioned areas both types of emulsions are produced together; that is, the water which is the disperse phase in the normal water-in-oil emulsion is, in itself, an oil-in-water emulsion. Ordinary demulsifiers, which resolve water-in-oil emulsions, have little or no effect on the accompanying oil-in-water type. These latter emulsions have heretofore proven difficult to resolve and the recovery of the oil contained therein, which often means the difference between a successful or unsuccessful operation, has presented many problems.

We have discovered that petroleum emulsions, and more particularly the reversed oil-in-water emulsions, may be readily and quickly resolved into their component parts by any one, or combination, of the chemicals disclosed herein. Further, our investigations show that after treatment the water discharged from gun-barrel or settling tanks has excellent clarity, and the recovered oil is homogeneous, e. g., free from focculent materials obtained when inorganic electrolytes such as calcium chloride and/or zinc chloride, with or without protective colloids, are used. In some instances, it is preferable to treat a mixture containing both types of emulsions by the addition of a single fluid containing a composition of the present invention and an added specific demulsifier for the normal water-in-oil emulsion where the demulsifiers for the different emulsions are compatible.

In accordance with the process of the present invention, we subject a petroleum emulsion of the oil-in-water type to the action of a small proportion of a complex organic condensation product prepared from a polyhydroxy aliphatic compound having hydroxy groups connected to different carbon atoms and a detergent forming body possessing an acidic function and containing a hydrocarbon structure of at least eight carbon atoms. The polyhydroxy compound is preferably a polyalkylene polyhydroxy compound, and the detergent forming body is preferably selected from the group consisting of higher fatty acids, rosin and resin acids, naphthenic acids, and their esters or amides, in which the hydrocarbon structure has eight or more carbon atoms. As will hereinafter be explained, these reacting substances are utilized in the preparation of these demulsifying agents, and various combinations and orders of reacting these various chemicals are contemplated, as will be seen from the following discussion.

The present invention is based on the discovery that a sub-resinous water-dispersible colloid of the kind hereinafter described, which may or may not be admixed with one or more hydrophilic, un-ionized colloids of the kind hereinafter described, is an excellent demulsifier, and of particular use for resolving reversed emulsions of the oil-in-water type.

The sub-resinous colloids preferably employed for the purpose of the invention may be prepared by heating naturally occurring or modified glycerides of fatty bodies having an inherently available acidic function, such as animal, marine, and vegetable fats and oils, or the fatty acids themselves, with polyalkylene polyhydroxy bodies, with the resulting loss of water.

Typical examples of suitable fatty bodies employed for the preparation of complex condensation products for the purpose of the invention are palmitin, olein, stearin, sardine oil, menhaden oil, sperm oil, and vegetable oils, such as castor, coconut, soy-bean, cottonseed, peanut, tung, and oiticica.

The water-dispersible sub-resinous reaction product of the polyhydroxy aliphatic compound and the detergent forming body possessing an acidic function may be used as such or may be used in a modified form, in which case the sub-resinous colloid would act as an intermediate in the preparation of a modified product. Thus, the resulting product from the reaction of a fatty body and the polyhydroxy body may be further reacted with an acidic compound to yield an ester, or a nitrogen derivative. This acidic compound may be chosen from monobasic or polybasic compounds. In the case of these derivatives of a polybasic body, any residual acidic groups may be further reacted with hydroxy groups to form esters, with metals of the alkali or alkaline earths to form salts, with amines to form amine salts, or further condensed to yield amides. The aliphatic or fatty body portion of the sub-resinous colloid may also be modified in some cases by reactions which involve an addition to the unsaturated ethylenic linkage. Through such a reaction, hydroxy groups, sulphate groups, and sulfonate groups may be introduced. These various reactions may be effected while still retaining the sub-resinous characteristic of the product.

The reactions are controlled in such a manner that the resulting products are soluble colloidally, dispersible in water, or water wettable, at least to the extent necessary to assure their finding their way in minute quantities to the interfacial surfaces where their local action will produce the resolving effect. Since it is possible to secure effective resolving action by the addition of very small amounts of the resolving agent, within a range of from about 0.05% down as low as 0.004% of the main mass to which the resolving agent is added, it will be apparent that the degree of solubility necessary can be quite low.

As additional examples of suitable detergent forming bodies possessing an acidic function, any suitable detergent forming acid may be selected from the group comprising saturated and unsaturated detergent forming acids or esters, having eight or more carbon atoms in their fatty chains, resin acids, naphthenic acids, acidic resins containing a free acidic (e. g., monocarboxylic) group or groups (e. g., dicarboxylic), for instance, hydrogenated rosin, run Congo, other similar oil soluble acidic resins, and the like. Modification products of detergent forming acids such as the sulfonated, halogenated, oxidized and internally esterified fatty bodies are suitable modifying agents in the preparation of our demulsifiers. They must, of course, have an acidic group or groups capable of reacting with a hydroxy group present in the polyhydroxy compound. Such acidic groups comprise carboxyl and/or sulfonic groups, their esters, or their reactive equivalents.

As examples of suitable polyalkylene polyhydroxy compounds we may mention diethylene glycol, triethylene glycol, tetraethylene glycol, pentaethylene glycol, hexaethylene glycol, and higher members of the same homologous series; dipropylene glycol, tripropylene glycol and higher members of the same homologous series; dibutylene glycol, tributylene glycol and higher members of the same homologous series; diamylene glycol, triamylene glycol and higher members of the same homologous series.

As examples of hydrophilic un-ionized colloids from which we may select one or more suitable colloids for our purpose, the following may be mentioned: starch, dextrin, gum-arabic, gelatin, glue, casein, gum tragacanth, gum karaya, agar-agar, tannin, urea-formaldehyde, water dispersible resins, and water soluble alkyl celluloses (e. g., methyl cellulose).

A resolving agent of the type herein described may be applied to the material to be demulsified in any of the suitable ways well known to those skilled in the art. Specifically, it may be injected in a single small stream, either continuously or intermittently at intervals into the flow line of an oil well, by means of a force-feed pump. Alternatively, it may be added manually to the fluid in a gun-barrel, using agitation with gas to secure thorough mixing. As prepared by the procedures herein outlined it is occasionally somewhat too concentrated, or viscous, or both, for convenient handling in commercial proportioning pumps, but it may readily be diluted with any suitable hydrocarbon diluent employed as an intermediate vehicle. One such vehicle which is effective, cheap and readily available is referred to by those skilled in the art as $SO_2$ (sulfur dioxide) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which, as previously indicated, is designated in the trade as $SO_2$ extract.

The invention will be further illustrated but is not limited by the following examples in which the quantities are stated in parts by weight unless otherwise indicated.

Example I

One molecular weight of ricinoleic acid (or equivalent weight of castor oil), 150 parts of sulfur dioxide extract derived from kerosene distillate and one molecular weight of triethylene glycol are mixed and heated to 150–210° C. until one molecular weight of water has distilled from the reaction product.

Example II

Two molecular weights of ricinoleic acid (or equivalent weight of castor oil), 150 parts of sulfur dioxide extract derived from kerosene distillate and one molecular weight of triethylene glycol are mixed and heated to 150–200° C. until two molecular weights of water have been distilled from the reaction mass.

Example III

One molecular weight of ricinoleic acid (or equivalent weight of castor oil), 150 parts of sulfur dioxide extract, and one molecular weight of tributylene glycol are mixed and heated to 150–200° C. until one molecular weight of water has been distilled from the reaction mass.

Example IV

The condensation product from Example I can be heated with one molecular weight of phthalic anhydride at 155° C. for six hours to partially esterify the residual hydroxy groups. The resulting product can be used as such, or the residual acidity of the resulting product can be neutralized with an inorganic base (e. g., ammonia, sodium carbonate) or an amine (e. g., cyclohexylamine).

Example V

The condensation product from Example I can be treated for two hours with 98% sulfuric acid at a low temperature around 30° C. such that it will permit the reaction with the fatty body double bond and so that hydrolysis of the condensation product will not occur. The excess free sulfuric acid is then removed in conventional manner and the resulting organic sulfonic body can be neutralized with suitable alkali or an amine.

The foregoing examples are only a few of the many products which may be prepared according to the principles disclosed in the preceding discussion. The condensation products described in any of the preceding examples can be admixed with minor proportions of hydrophilic, un-ionized colloids, preferably with the addition of a mutual solvent for the condensation product and the hydrophilic colloid. Thus, 9.5 parts by weight of the product described in Example I may be heated with approximately 1 part by weight of bone glue and approximately 2.5 parts by weight of isopropyl alcohol and 13.3 parts by weight of water with stirring until a homogenous product is obtained and the glue has gone into solution. In a similar manner, the other condensation products described in the examples may be admixed with a suitable hydrophilic colloid. Other suitable mutual solvents are butyl alcohol, diethylene glycol monobutyl ether, ethylene glycol monobutyl ether, and homologous water-dispersible alcohols, and alcohol ethers.

Various examples of the many products which answer the descriptions herein made are contemplated. Some may be oil soluble, others water soluble. In many instances they may possess dual solubility to an appreciable extent. Even apparent insolubility is of no consequence, as the products are all soluble at least to the extent necessary for segregation at the emulsion interface as a water-wettable colloid. The suitability of any of these products to the breaking and resolving of any given emulsion can readily be determined by the conventional procedures now in general use in oil-fields and in laboratories which make such determinations.

The term "water-soluble" is used to include the property of forming colloidally hydrated aqueous solution. From the foregoing description it will be seen that only a limited degree of actual "water-solubility" is necessary for the reagents used for breaking petroleum emulsions, for the reason that extremely small proportions of the reagents are ordinarily used. The term "oil-soluble" is used to include the property of colloidal dispersion in the oil phase.

Having thus described the invention, what we claim as new and desire to secure by Letters Patent of the United States is:

1. A process for the resolution of oil-in-water emulsions which comprises subjecting an oil-in-water emulsion to the action of a water dispersible product of the reaction of a polyalkylene glycol and a substance selected from the group consisting of detergent forming acids and their esters having at least 8 carbon atoms in an aliphatic carbon chain reacted with the elimination of water at temperatures within the range of 150 degrees C. to 210 degrees C. in relative proportions equivalent to at least 1 mol of acid per mol of glycol but less than the amount theoretically required to completely esterify all of the hydroxyl groups in the polyalkylene glycol.

2. A process for the resolution of oil-in-water emulsions which comprises subjecting an oil-in-water emulsion to the action of a water dispersible product of the reaction of a polyethylene glycol and a substance selected from the group consisting of fatty acids and their esters having at least 8 carbon atoms in an aliphatic carbon chain reacted with the elimination of water at temperatures within the range of 150 degrees C. to 210 degrees C. in relative proportions equivalent to at least 1 mol of acid per mol of glycol but less than the amount theoretically required to completely esterify all of the hydroxyl groups in the polyethylene glycol.

3. A process for the resolution of oil-in-water emulsions which comprise subjecting an oil-in-water emulsion to the action of a water dispersible product of the reaction of a polyalkylene glycol and a fatty acid ester having at least 8 carbon atoms in an aliphatic carbon chain reacted with the elimination of water at temperatures within the range of 150 degrees C. to 210 degrees C. in relative proportions equivalent to at least 1 mol of acid in the ester molecule per mol of glycol but less than the amount theoretically required to completely esterify all of the hydroxyl groups in the polyalkylene glycol.

4. A process for the resolution of oil-in-water emulsions which comprises subjecting an oil-in-water emulsion to the action of a water dispersible product of the reaction of a polyalkylene glycol and a fatty acid having at least 8 carbon atoms in an aliphatic carbon chain reacted with the elimination of water at temperatures within the range of 150 degrees C. to 210 degrees C. in relative proportions equivalent to at least 1 mol of acid to 1 mol of glycol but less than the amount theoretically required to completely esterify all of the hydroxyl groups in the polyalkylene glycol.

5. A process for the resolution of oil-in-water emulsions which comprises subjecting an oil-in-water emulsion to the action of a water dispersible product of the reaction of a polyalkylene glycol and ricinoleic acid reacted with the elimination of water at temperatures within the range of 150 degrees C. to 210 degrees C. in relative proportions equivalent to at least 1 mol of acid per mol of glycol but less than the amount theoretically required to completely esterify all of the hydroxyl groups in the polyalkylene glycol.

6. A process for the resolution of oil-in-water emulsions which comprises subjecting an oil-in-water emulsion to the action of a water dispersible product of the reaction of a polyalkylene glycol and castor oil reacted with the elimination of water at temperatures within the range of 150 degrees to 210 degrees C. in relative proportions equivalent to at least 1 mol of the fatty acid in the castor oil molecule per mol of glycol but less than the amount theoretically required to completely esterify all of the hydroxyl groups in the polyalkylene glycol.

7. A process for the resolution of oil-in-water emulsions which comprises subjecting an oil-in-water emulsion to the action of a water dispersible product of the reaction of a polyalkylene glycol and a substance selected from the group consisting of detergent forming acids and their esters having at least 8 carbon atoms in an aliphatic carbon chain reacted with the elimination of water at temperatures within the range of 150 degrees C. to 210 degrees C. in relative proportions equivalent to at least 1 mol of acid per mol of glycol but less than the amount theoretically required to completely esterify all of the hydroxyl groups in the polyalkylene glycol, admixed with a minor proportion of a hydrophilic unionized colloid.

8. A process for the resolution of oil-in-water emulsions which comprises subjecting an oil-in-water emulsion to the action of a water dispersible product of the reaction of a polyalkylene glycol and a substance selected from the group consisting of detergent forming acids and their esters having at least 8 carbon atoms in an aliphatic carbon chain reacted with the elimination of water at temperatures within the range of 150 degrees C. to 210 degrees C. in relative proportions equivalent to at least 1 mol of acid per mol of glycol but less than the amount theoretically required to completely esterify all of the hydroxyl groups in the polyalkylene glycol, admixed with a minor proportion of bone glue.

9. A process for the resolution of oil-in-water emulsions which comprises subjecting an oil-in-water emulsion to the action of a water dispersible product of the reaction of a polyalkylene glycol and a substance selected from the group consisting of detergent forming acids and their esters having at least 8 carbon atoms in an aliphatic carbon chain reacted with the elimination of water at temperatures within the range of 150 degrees C. to 210 degrees C. in relative proportions equivalent to at least 1 mol of acid per mol of glycol but less than the amount theoretically required to completely esterify all of the hydroxyl groups in the polyalkylene glycol, admixed with a minor proportion of a hydrophilic unionized colloid in a mutual solvent for said reaction product and said hydrophilic unionized colloid.

10. A process for the resolution of oil-in-water emulsions which comprises subjecting an oil-in-water emulsion to the action of a water dispersible product of the reaction of a polyalkylene glycol and a substance selected from the group consisting of detergent forming acids and their esters having at least 8 carbon atoms in an aliphatic carbon chain reacted with the elimination of water at temperatures within the range of 150 degrees C. to 210 degrees C. in relative proportions equivalent to at least 1 mol of acid per mol of glycol but less than the amount theoretically required to completely esterify all of the hydroxyl groups in the polyalkylene glycol, said unesterified hydroxyl groups being further esterified at least in part with an acid.

11. A process for the resolution of oil-in-water emulsions which comprises subjecting an oil-in-water emulsion to the action of a water dispersible product of the reaction of a polyalkylene glycol and a substance selected from the group consisting of detergent forming acids and their esters having at least 8 carbon atoms in an aliphatic carbon chain reacted with the elimination of water at temperatures within the range of 150 degrees C. to 210 degrees C. in relative proportions equivalent to at least 1 mol of acid per mol of glycol but less than the amount theoretically required to completely esterify all of the hydroxyl groups in the polyalkylene glycol, said unesterified hydroxyl groups being further esterified at least in part with a polybasic organic acid.

12. A process for the resolution of oil-in-water petroleum emulsions of the type encountered in southwestern Texas which comprises subjecting such petroleum emulsion to the action of a water dispersible product of the reaction of a polyethylene glycol and castor oil reacted with the elimination of water at temperatures within the range of 150 degrees C. to 210 degrees C. in relative proportions equivalent to at least 1 mol of acid in the castor oil molecule per mol of glycol but less than the amount theoretically required to completely esterify all of the hydroxyl groups in the polyethylene glycol, admixed with a minor proportion of a hydrophilic unionized colloid in a mutual solvent for said reaction product and the hydrophilic unionized colloid.

13. A process for the resolution of oil-in-water petroleum emulsions of the type encountered in southwestern Texas which comprises subjecting such petroleum emulsion to the action of a water dispersible product of the reaction of a polyethylene glycol and ricinoleic acid reacted with the elimination of water at temperatures within the range of 150 degrees C. to 210 degrees C. in relative proportions equivalent to at least 1 mol of acid per mol of glycol but less than the amount theoretically required to completely esterify all of the hydroxyl groups in the polyethylene glycol, admixed with a minor proportion of a hydrophilic unionized colloid in a mutual solvent for said reaction product and the hydrophilic unionized colloid.

14. A process for the resolution of oil-in-water emulsions which comprises subjecting an oil-in-water emulsion to the action of a water dispersible product of the reaction of a polyethylene glycol and ricinoleic acid reacted with the elimination of water at temperatures within the range of 150 degrees C. to 210 degrees C. in relative proportions equivalent to at least 1 mol of acid per mol of glycol but less than the amount theoretically required to completely esterify all of the hydroxyl groups in the polyethylene glycol, said residual hydroxyl groups being at least partially esterified by further reaction with phthalic anhydride and the resultant product substantially neutralized with a base.

15. A process for the resolution of oil-in-water emulsions which comprises subjecting an oil-in-water emulsion to the action of a water dispersible product of the reaction of a polyethylene glycol and ricinoleic acid reacted with the elimination of water at temperatures within the range of 150 degrees C. to 210 degrees C. in relative proportions equivalent to at least 1 mol of acid per mol of glycol but less than the amount theoretically required to completely esterify all of the hydroxyl groups in the polyethylene glycol, said reaction product being further reacted with concentrated sulfuric acid and then substantially neutralized.

WILLARD H. KIRKPATRICK.
DOYNE L. WILSON.

REFERENCES CITED

The following references are of record in the file of this patent:

UNITED STATES PATENTS

| Number | Name | Date |
|---|---|---|
| 2,052,284 | De Groote | Aug. 25, 1936 |
| 2,089,569 | Orthner | Aug. 10, 1937 |
| 2,174,760 | Schuette et al. | Oct. 3, 1939 |
| 2,190,673 | Orelup | Feb. 20, 1940 |
| 2,214,784 | Wayne | Sept. 17, 1940 |
| 2,341,846 | Meincke | Feb. 15, 1944 |
| 2,354,993 | Harlan | Aug. 1, 1944 |
| 2,401,966 | Salathiel | June 11, 1946 |